US011939103B2

(12) United States Patent
Scott et al.

(10) Patent No.: US 11,939,103 B2
(45) Date of Patent: Mar. 26, 2024

(54) LABEL PLACEMENT SYSTEM

(71) Applicant: INTELLIGRATED HEADQUARTERS, LLC, Mason, OH (US)

(72) Inventors: Darius Scott, Baltimore, MD (US); Joseph Joice, Baltimore, MD (US); Jon Joseph Tribe, Reisterstown, MD (US); Satyam Ulhas Deshmukh, Newark, DE (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 104 days.

(21) Appl. No.: 17/545,525

(22) Filed: Dec. 8, 2021

(65) Prior Publication Data

US 2022/0097890 A1 Mar. 31, 2022

Related U.S. Application Data

(63) Continuation of application No. 16/297,172, filed on Mar. 8, 2019, now Pat. No. 11,220,366.

(51) Int. Cl.
*B65C 9/08* (2006.01)
*B65C 1/02* (2006.01)
(Continued)

(52) U.S. Cl.
CPC ................ *B65C 9/08* (2013.01); *B65C 1/025* (2013.01); *B65C 9/06* (2013.01); *B65C 9/40* (2013.01); *G09F 3/0297* (2013.01)

(58) Field of Classification Search
CPC .. B65C 9/08; B65C 9/06; B65C 1/025; B65C 9/40
See application file for complete search history.

(56) References Cited

U.S. PATENT DOCUMENTS 4,321,103 A * 3/1982 Lindstrom ............ B65C 9/1865 156/556
5,161,791 A 11/1992 Akiyama et al.
(Continued)

OTHER PUBLICATIONS

"10 Tips for setting Up a Label Print and Apply System" [online], [retrieved from the Internet on Jun. 9, 2019], <https://www.bastiansolutions.com/10-tips-for-setting-up-a-label-print-and-apply-system/>, 9 pages.
(Continued)

*Primary Examiner* — Robert F Long
*Assistant Examiner* — Xavier A Madison
(74) *Attorney, Agent, or Firm* — Alston & Bird LLP

(57) ABSTRACT

The present disclosure relates to a label-placement module having a first feeder assembly, including a horizontal delivery platter for receiving a label, and a first drive wheel, positioned adjacent to a distal end of the horizontal delivery platter and rotatable to move the label on the horizontal delivery platter in a first direction. The label-placement module may include a second feeder assembly coupled to an actuator that moves the second feeder assembly vertically to a delivery position associated with the container. The second feeder assembly having a vertical delivery platter for receiving the label from the horizontal delivery platter and a second drive wheel rotatable to move the label forward in the first direction towards the container such that at least a portion of the label may be clamped between the container and a lid of the container thereby attaching the label to the container.

20 Claims, 6 Drawing Sheets

(51) Int. Cl.

| | |
|---|---|
| ***B65C 9/06*** | (2006.01) |
| ***B65C 9/40*** | (2006.01) |
| *G09F 3/00* | (2006.01) |

(56) References Cited

U.S. PATENT DOCUMENTS

| | | | | |
|---|---|---|---|---|
| 5,358,595 | A | 10/1994 | Williams | |
| 5,674,345 | A * | 10/1997 | Nash | B65C 9/1803 271/275 |
| 6,143,105 | A | 11/2000 | Nash et al. | |
| 6,955,000 | B2 | 10/2005 | Pawlik et al. | |
| 10,556,715 | B2 * | 2/2020 | Vicktorius | B65C 9/28 |
| 11,220,366 | B2 | 1/2022 | Scott et al. | |
| 2005/0155887 | A1 | 7/2005 | Bazany et al. | |
| 2009/0042705 | A1 | 2/2009 | Maslowski et al. | |
| 2010/0242411 | A1 | 9/2010 | Boekstegers et al. | |
| 2014/0096900 | A1 | 4/2014 | Wojdyla et al. | |
| 2015/0121815 | A1 | 5/2015 | Larsson et al. | |
| 2016/0152400 | A1 | 6/2016 | Tinoco | |

OTHER PUBLICATIONS

"Label plastic crates with a Robot" YouTube, Oct. 22, 2015, [online], [retrieved from the Internet Jun. 7, 2019], <URL: https://www.youtube.com/watch?v=G3jr2z1hLgl>.

"Packing Slip/Labeling System for Totes" YouTube, Dec. 10, 2012, [online], [retrieved from the Internet Jun. 7, 2019], <URL:https://www.youtube.com/watch?v=fenNzZNpC3M>.

Non-Final Rejection dated Apr. 28, 2021 for U.S. Appl. No. 16/297,172.

Notice of Allowance received for U.S. Appl. No. 16/297,172, dated Sep. 9, 2021, 9 pages.

* cited by examiner

LABEL PLACEMENT SYSTEM

CROSS REFERENCE TO RELATED APPLICATIONS

This application is a continuation of U.S. application Ser. No. 16/297,172, filed Mar. 8, 2019, the entire contents of which are incorporated herein by reference.

TECHNOLOGICAL FIELD

Example embodiments of the present invention relate generally to material handling systems, and more particularly, to systems for placing labels on containers and/or products.

BACKGROUND

In a high-volume distribution and fulfillment center, labels, such as barcode labels, on products and/or containers are vital to the material handling process. Labels typically contain identifiers and/or other information associated with the products and/or containers for material handling systems to accurately identify, track, store and/or ship products and/or containers. Thus, label placement methods and systems are essential to the efficiency and accuracy of the distribution center.

Applicant has identified several technical challenges associated with label placement and other associated systems and methods. Through applied effort, ingenuity, and innovation, many of these identified challenges have been overcome by developing solutions that are included in embodiments of the present invention, many examples of which are described in detail herein.

BRIEF SUMMARY

The following presents a simplified summary to provide a basic understanding of some aspects of the disclosed label placement systems and methods. This summary is not an extensive overview and is intended to neither identify key or critical elements nor delineate the scope of such elements. Its purpose is to present some concepts of the described features in a simplified form as a prelude to the more detailed description that is presented later.

The illustrative embodiments of the present disclosure relate to systems and methods for placing labels in a material handling environment. According to at least one aspect of the present disclosure, a label-placement module is provided. The label-placement module may include a first feeder assembly having a horizontal delivery platter that may be sized to receive a label to be attached to a container and a first drive wheel, that may be positioned adjacent to a distal end of the horizontal delivery platter and may be in rotatable contact with the horizontal delivery platter, such that the first drive wheel may be rotatable to move the label on the horizontal delivery platter in a first direction. The label-placement module may further include a second feeder assembly coupled to an actuator. The actuator may move the second feeder assembly vertically to a delivery position associated with the container. The second feeder assembly may further include a vertical delivery platter that may be positioned adjacent the horizontal delivery platter and the first drive wheel, that may be sized to receive the label from the horizontal delivery platter. The second feeder assembly may further include a second drive wheel positioned adjacent to a proximal end of the vertical delivery platter and may be in rotatable contact with the vertical delivery platter, such that the second drive wheel may be rotatable to move the label on the vertical delivery platter in the first direction. The label placement module may further include a lidding module that may place a lid on the container such that at least a portion of the label is between the lid and the container thereby attaching the label to the container.

According to one or more embodiments of the present disclosure, the label-placement module may further include a label delivery ramp having an inclined surface for delivering labels from a printer to the horizontal delivery platter.

According to one or more embodiments of the present disclosure, the actuator may move the second feeder assembly along a vertical rail to one of a plurality of delivery positions associated with one or more containers.

According to one or more embodiments of the present disclosure, the first feeder assembly may further include a first roller, coupled to the first drive wheel, for rotatably driving the first drive wheel.

According to one or more embodiments of the present disclosure, the second feeder assembly may further include a second roller, coupled to the second drive wheel, for rotatably driving the second drive wheel.

According to one or more embodiments of the present disclosure, the label-placement module may further include a container detection module having one or more sensors detecting one or more parameters associated with a container. In an embodiment, the actuator may move the second feeder assembly to one of a plurality of delivery positions based on the one or more parameters associated with the container.

According to one or more embodiments of the present disclosure, the first feeder assembly may further include one or more sensors to detect a presence of a label on the horizontal delivery platter.

According to one or more embodiments of the present disclosure, the second feeder assembly may further include a first sensor positioned at the proximal end of the vertical delivery platter, such that the first sensor may detect at least one of a leading edge and a trailing edge of the label on the vertical delivery platter.

According to one or more embodiments of the present disclosure, the second feeder assembly may further include a second sensor positioned at the distal end of the vertical delivery platter, such that the second sensor may detect at least one of a leading edge and a trailing edge of the label on the vertical delivery platter.

According to another aspect of the present disclosure, a material handling system for attaching a label to a container is provided. The material handling system may include a label-placement module. The label-placement module may include a first feeder assembly having a horizontal delivery platter that may be sized to receive a label to be attached to a container and a first drive wheel, that may be positioned adjacent to a distal end of the horizontal delivery platter and may be in rotatable contact with the horizontal delivery platter, such that the first drive wheel may be rotatable to move the label on the horizontal delivery platter in a first direction. The label-placement module may further include a second feeder assembly coupled to an actuator. The actuator may move the second feeder assembly vertically to a delivery position associated with the container. The second feeder assembly may further include a vertical delivery platter that may be positioned adjacent the horizontal delivery platter and the first drive wheel, that may be sized to receive the label from the horizontal delivery platter. The second feeder assembly may further include a second drive wheel positioned adjacent to a proximal end of the vertical delivery platter and may be in rotatable contact with the vertical delivery platter, such that the second drive wheel may be rotatable to move the label on the vertical delivery platter in the first direction. The material handling system may further include a lidding module that may place a lid on the container such that at least a portion of the label is between the lid and the container thereby attaching the label to the container.

According to one or more embodiments of the present disclosure, the label-placement module may further include a label delivery ramp having an inclined surface for delivering labels from a printer to the horizontal delivery platter.

According to one or more embodiments of the present disclosure, the actuator may move the second feeder assembly along a vertical rail to one of a plurality of delivery positions associated with one or more containers.

According to one or more embodiments of the present disclosure, the label-placement module may further include a container detection module having one or more sensors detecting one or more parameters associated with a container. In an embodiment, the actuator may move the second feeder assembly to one of a plurality of delivery positions based on the one or more parameters associated with the container.

According to one or more embodiments of the present disclosure, the first feeder assembly may further include one or more sensors detecting a presence of a label on the horizontal delivery platter.

According to one or more embodiments of the present disclosure, the second feeder assembly may further include a first sensor positioned at the proximal end of the vertical delivery platter, such that the first sensor may detect at least one of a leading edge and a trailing edge of the label on the vertical delivery platter.

According to one or more embodiments of the present disclosure, the second feeder assembly may further include a second sensor positioned at the distal end of the vertical delivery platter, such that the second sensor may detect at least one of a leading edge and a trailing edge of the label on the vertical delivery platter.

According to one or more embodiments of the present disclosure, the material handling system may further include a controller for receiving a notification of a presence of the label on the horizontal delivery platter. In response to the notification, the controller may drive the first drive wheel to rotatably move the label forward in the first direction to transfer the label from horizontal delivery platter to the vertical delivery platter, actuate the actuator to move the second feeder assembly vertically to the delivery position associated with the container, drive the second drive wheel to rotatably move the label forward in the first direction towards the container, and actuate the lidding module to place the lid on the container such that at least a portion of the label is between the lid and the container thereby attaching the label to the container.

According to another aspect of the present disclosure, a method of placing a label on a container is provided. The method may include receiving a notification of a label at a horizontal delivery platter of a first feeder assembly, driving a first drive wheel, positioned adjacent to a distal end of the horizontal delivery platter and in rotatable contact with the horizontal delivery platter, to rotatably move the label on the horizontal delivery platter in a first direction to transfer the label from horizontal delivery platter to a vertical delivery platter of a second feeder assembly, actuating, an actuator coupled to the second feeder assembly, to move the second feeder assembly vertically to a delivery position associated with the container, driving a second drive wheel, positioned adjacent to a proximal end of the vertical delivery platter and in rotatable contact with the vertical delivery platter, to rotatably move the label on the vertical delivery platter in the first direction, and actuating a lidding module to place a lid on the container such that at least a portion of the label is between the lid and the container thereby attaching the label to the container.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art of the present disclosure that these concepts may be practiced without these specific details.

In distribution and/or order fulfillment centers, labels are generally used to identify, track, route, store, and/or direct shipment of products, totes, bins, and/or containers. To facilitate labeling, distribution and/or order fulfillment centers may include a label placement system. In some examples, such label placement system may affix labels onto the products and/or reusable containers using adhesive.

However, in some examples, labels affixed on reusable totes, bin, and/or containers may need to be removed before each new operation. That is, prior to a tote, bin, and/or container being reused, a label may need to be removed and replaced by a new label. In some examples, removing labels and/or any adhesive residue on the totes, bin, and/or containers is challenging, time consuming, and adds to maintenance costs of the distribution and/or order fulfillment center.

The label-placement module described herein, in accordance with one or more example embodiments of the present disclosure, relies on clamping labels between a tote, bin, and/or container and a lid of the tote, bin, and/or container. Thus, in some examples, the label may easily be removed from the reusable tote, bin, and/or container by opening the lid and releasing the label clamped between the tote, bin, and/or container and the lid.

Figure 1:
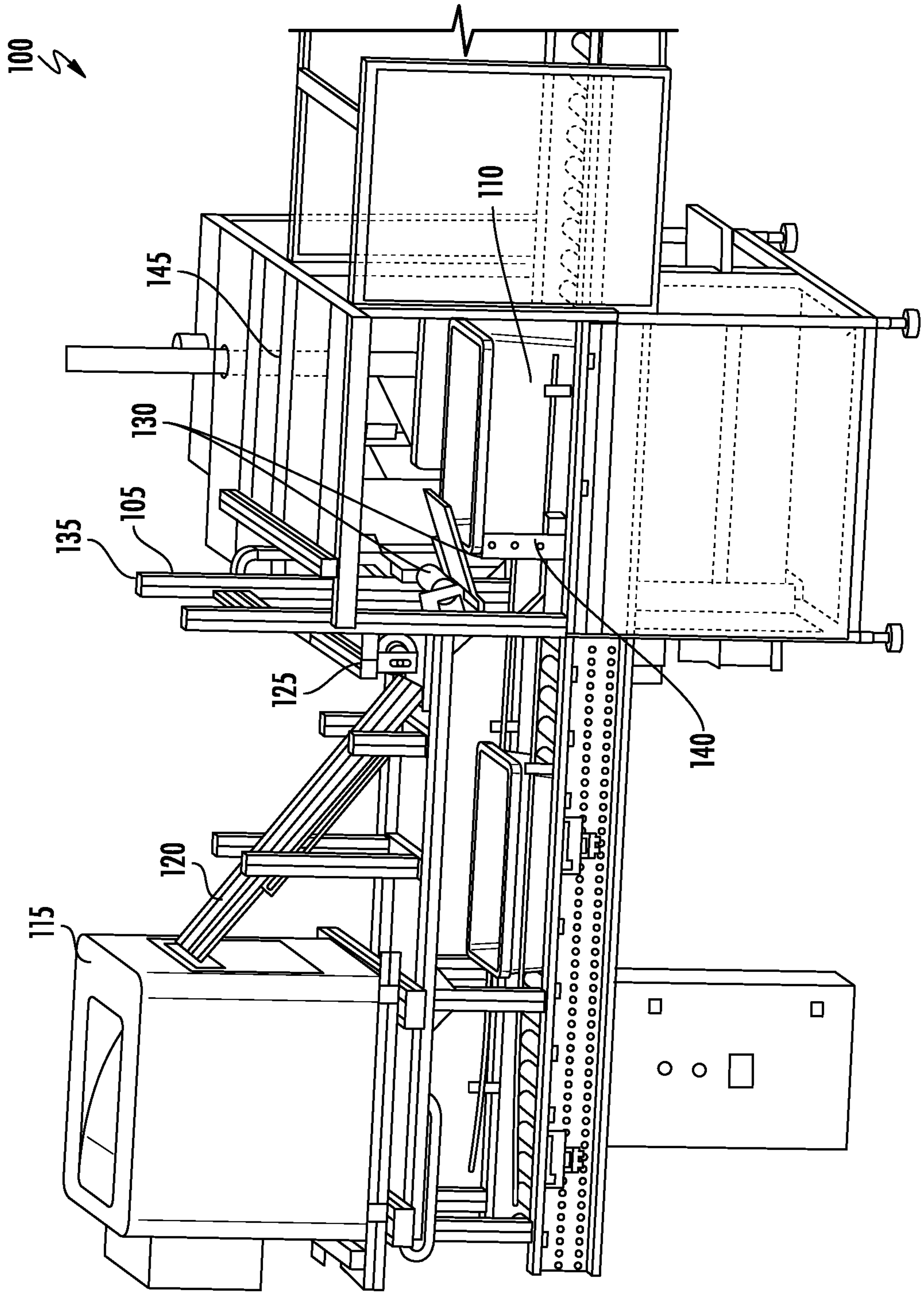
FIG. 1 illustrates a perspective view of a material handling system in accordance with an example embodiment of the present disclosure.

FIG. 1 illustrates a perspective view of a material handling system 100, in accordance with one or more embodiments of the present disclosure. As shown in FIG. 1, the material handling system may include a label-placement module 105 for applying labels a container 110, such as, but not limited to, totes, bins, and/or containers. The label-placement module 105 may receive the container 110 automatically, such as through a conveyor system, through a feeder system, and/or manually by a worker. Further, as shown in FIG. 1, the material handling system 100 and/or the label-placement module 105 may also include a printer 115 for printing labels to be clamped to the container 110. The printer 115 may refer to any printer for printing labels, as is known in the art. In some example embodiments, the printer 115 may include means for encoding a Radio-Frequency Identification ("RFID") chip and/or other tracking means onto the labels.

In an example embodiment, the printer 115 may be coupled to a label delivery ramp 120, as shown in FIG. 1. The label delivery ramp 120 may receive labels from the printer 115 and may transfer the labels to the label-placement module 105. In an example embodiment, the label delivery ramp 120 may include a gravity chute and/or ramp for conveying labels to the label-placement module 105 under gravity. In other embodiments, the label delivery ramp 120 may include any other means for conveying the labels to the label-placement module 105, such as, but not limited to, a belted conveyor, a roller conveyor, and the like. Additionally and/or alternatively, the material handling system 100 may include other means for feeding printed labels to the label-placement module 105, such as by preparing a stack of pre-printed labels and delivering said labels as needed at the label-placement module 105 in a sequence.

Further, in accordance with the disclosed example embodiments, the label-placement module 105 may include a first feeder assembly 125 and a second feeder assembly 130, as shown in FIG. 1. In an example embodiment, the first feeder assembly 125 may receive a label to be clamped on the container 110 from the label delivery ramp 120. The first feeder assembly 125 may push or otherwise move the label forward to the second feeder assembly 130.

In an example embodiment, the second feeder assembly 130 may be vertically movable via an actuator 135 based on a delivery position associated with the container 110. Specifically, the material handling system 100 may include containers 110 of different heights, dimensions, shapes, and/or sizes. Accordingly, a delivery position for the second feeder assembly 130 that is used to deliver the label to be clamped to the container 110 may be different or otherwise be variable based on the dimensions of container 110.

In an example embodiment, the material handling system 100 and/or the label-placement module 105 may include a container detection module 140 for detecting at least a presence of a container 110 and/or one or more parameters associated with the containers 110, such as but not limited to, height, dimension, shape, type, size, and the like. In an embodiment, the container detection module 140 may include an array of vertically staked sensors, such as photo-eyes, proximity sensors, encoders, etc. for detecting a height, and/or other parameters associated with the container 110. Further, based on the one or more parameters detected by the container detection module 140 for the container 110, the material handling system 100 may determine a delivery position associated with the container 110. Accordingly, the second feeder assembly 130 may be moved vertically along a vertical rail by the actuator 135 to the delivery position associated with the container 110. Once the second feeder assembly 130 is at the delivery position, the second feeder assembly 130 may push the label forward towards the container 110.

Further, and in some examples, the material handling system 100 may include a lidding module 145. The lidding module 145 may place a lid on the container 110, such that at least a portion of the label may be clamped between the container 110 and the lid of the container 110. Alternatively and/or additionally, the lid may be placed on the container manually by a worker, clamping the label between the container and the lid. In an embodiment, the container 110 with the label attached to the container 110 may be conveyed downstream by the material handling system 100, while bringing a next container adjacent to the label-placement module 105.

Figure 2:
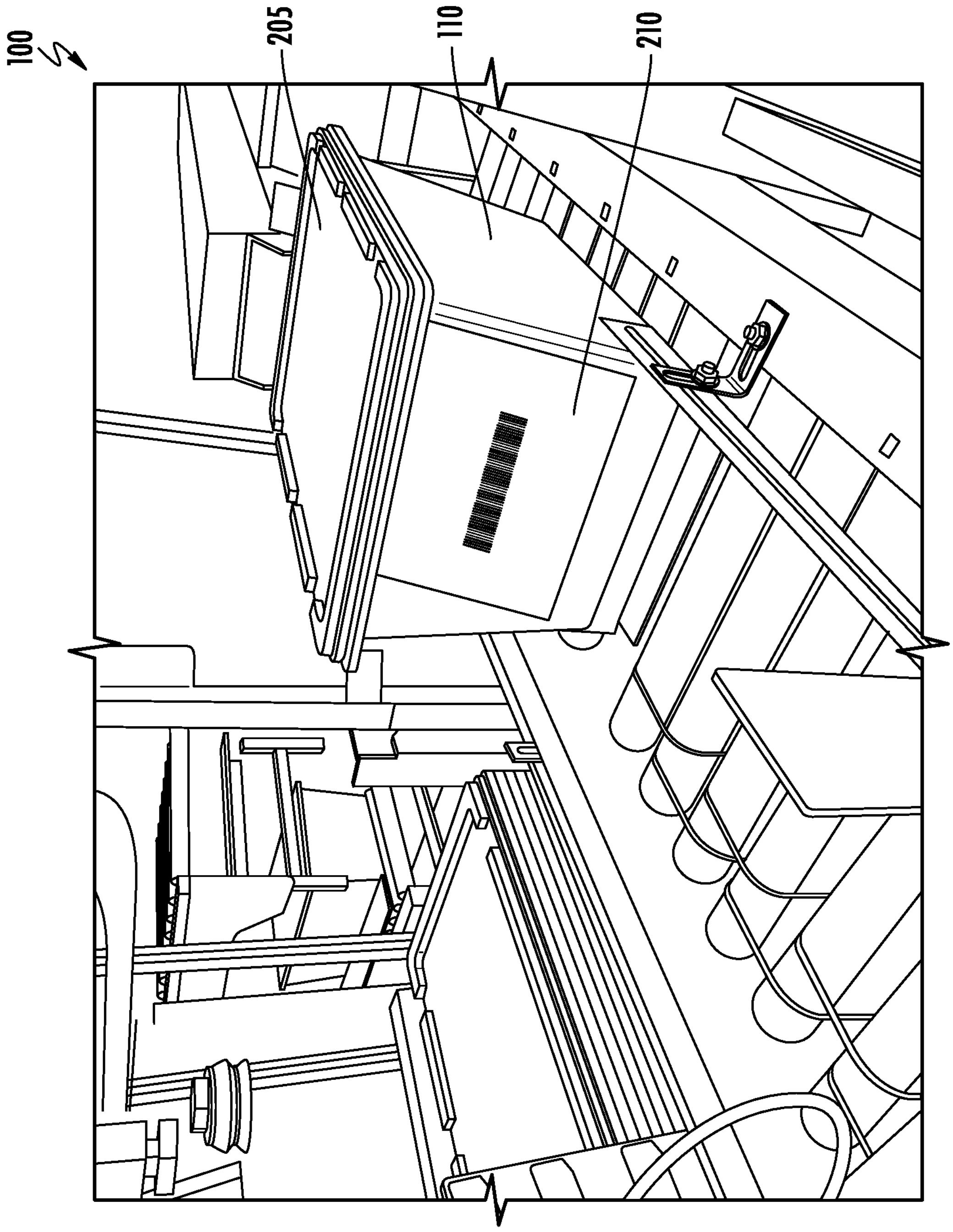
FIG. 2 illustrates another perspective view of the material handling system, in accordance with one or more example embodiments of the present disclosure.

FIG. 2 illustrates a perspective view of the material handling system 100, in accordance with one or more example embodiments of the present disclosure. As shown in FIG. 2, a lid 205 placed on a container 110. As is shown, the label 210 is clamped between the container 110 and the lid 205. Further, as shown in FIG. 2, the label 210 may be folded, in some examples, to a viewing angle as a result of a closing operation of the lid 205. That is, when the lidding module 145, as shown in FIG. 1 and/or a worker pushes the lid 205 to be clamped on top of the container 110, at least a portion of the label 210 may be clamped between the container 110 and the lid 205 and the label 210 may be folded downwards to form a viewing angle, as shown in FIG. 2. In some examples, the viewing angle for reading a barcode on the label 210 may be 0 to 90 degrees with respect to a direction of conveyance of the container 110. Thus, in some examples, the label 210 is affixed to the container 110 may be read easily by one or more devices and/or systems of the material handling system 100. Further, the label 210 may be released from the container 110 by removing the lid 205 of the container 110.

Figure 3:
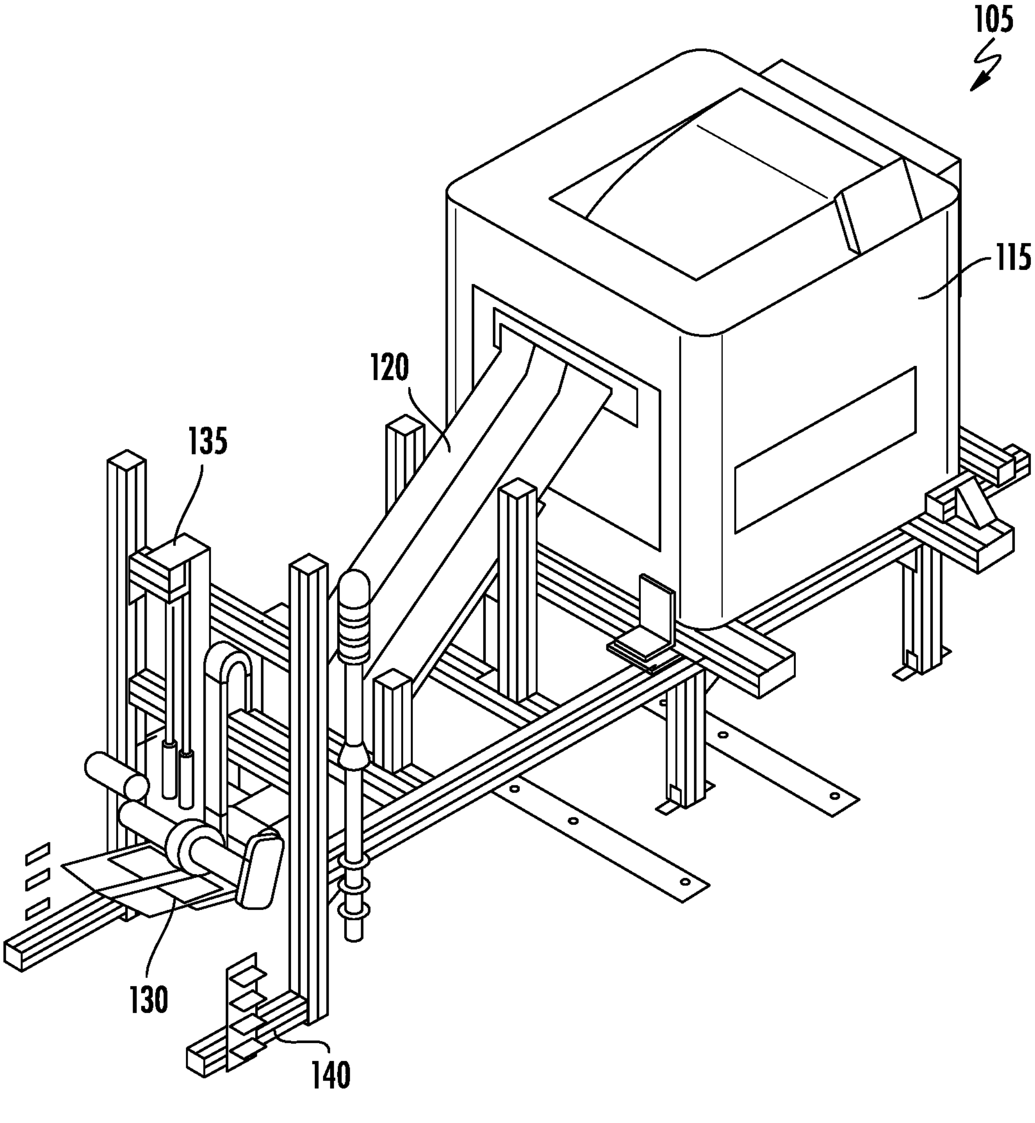
FIG. 3 illustrates a perspective view of a label-placement module, in accordance with one or more example embodiments of the present disclosure.

FIG. 3 illustrates another perspective view of the label-placement module 105, in accordance with one or more example embodiments of the present disclosure. As described above, the label-placement module 105 may include printer 115 for printing one or more labels to be affixed to the containers (not shown), the label delivery ramp 120 for receiving the labels from the printer 115 and transferring the labels to the first feeder assembly (not shown), and the second feeder assembly 130 for receiving the labels from the labels from the first feeder assembly and pushing the labels towards the containers to be affixed to the containers. The label-placement module 105 may also include actuator 135 coupled to the second feeder assembly 130 for vertically moving the second feeder assembly 130 to a delivery position associated with the containers, as described above with reference to FIG. 1. The actuator 135 may refer to an electric actuator, a pneumatic cylinder, and/or any other means of moving the second feeder assembly 130 vertically.

Figure 4:
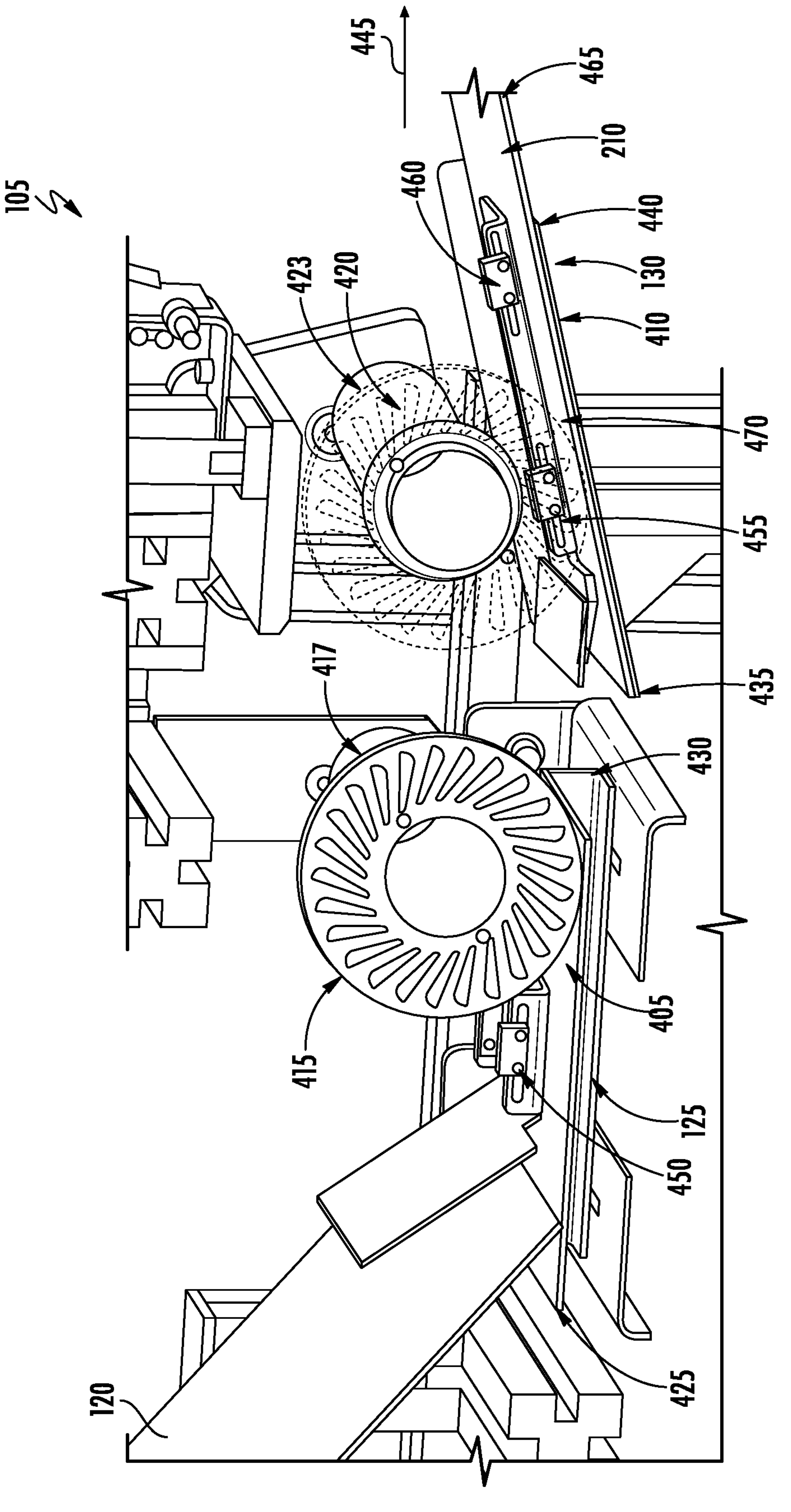
FIG. 4 illustrates another perspective view of the label-placement module, in accordance with one or more example embodiments of the present disclosure.

FIG. 4 illustrates a perspective view of a section of the label-placement module 105, in accordance with one or more example embodiments of the present disclosure. As shown in FIG. 4, the label-placement module 105 may include label delivery ramp 120 for delivering labels to the first feeder assembly 125. In an embodiment, the first feeder assembly 125 may include a horizontal delivery platter 405 positioned adjacent the label delivery ramp 120 for receiving the labels from the label delivery ramp 120. As shown in FIG. 4, the horizontal delivery platter 405 may include a proximal end 425 of the horizontal delivery platter 405 and a distal end 430 of the horizontal delivery platter 405.

In an example embodiment, the first feeder assembly 125 may include one or more sensors 450 positioned adjacent to the proximal end 425 of the horizontal delivery platter 405. One or more sensors 450 include, but not limited to, photo-eyes, proximity sensors, encoders, etc., and may detect at least a presence of a label on the horizontal delivery platter 405.

In accordance with example embodiments of the present disclosure, the first feeder assembly 125 may further include a first drive wheel 415 mounted on a first roller 417. The first roller 417, which may take the form of a motor-driven roller, idler roller coupled to a drive, etc., may drive the first drive wheel 415 such that when the first roller 417 rotates, such as by a motor, the first drive wheel 415 may also rotate. As shown in FIG. 4, the first drive wheel 415 may be positioned above the horizontal delivery platter 405 and adjacent to the distal end 430 of the horizontal delivery platter 405.

In an example embodiment, the first drive wheel 415 may contact the label placed on the horizontal delivery platter 405 and may rotatably push the label forward in a first direction 445 towards the second feeder assembly 130. Specifically, the one or more sensors 450 may detect a presence of a label on the horizontal delivery platter 405, and in response, the label-placement module 105 may drive the first drive wheel 415 such that the first drive wheel 415 may contact at least a leading edge of the label and may rotate while pushing or otherwise moving the label, between the first drive wheel 415 and the horizontal delivery platter 405, forward in the first direction 445. In some examples and in response to the label being moved in the first direction 445, the label may be transferred from the horizontal delivery platter 405 to the second feeder assembly 130.

In an example embodiment, the second feeder assembly 130 may include a vertical delivery platter 410, as shown in FIG. 4. The vertical delivery platter 410 may be positioned adjacent the horizontal delivery platter 405 such that the vertical delivery platter 410 may receive the label from the horizontal delivery platter 405. The vertical delivery platter 410 may include a proximal end 435 of the vertical delivery platter 410 and a distal end 440 of the vertical delivery platter 410. Further, the second feeder assembly 130 may include a second drive wheel 420 mounted on a second roller 423, as shown in FIG. 4. In an embodiment, the second drive wheel 420 may be positioned adjacent to the proximal end 435 of the vertical delivery platter 410.

In some example embodiments, the second feeder assembly 130 may include a first sensor 455 positioned adjacent to the proximal end 435 of the vertical delivery platter 410 and a second sensor 460 positioned adjacent to the distal end 440 of the vertical delivery platter 410. The first sensor 455 may detect a presence of a label 210 on the vertical delivery platter 410. In response to a detection, the label-placement module 105 may drive the second drive wheel 420 via the second roller 423 such that the second drive wheel 420 may contact at least a portion, such as a leading edge 465 of the label 210, and may rotatably push or otherwise move the label 210 forward to transfer the label 210 completely onto the vertical delivery platter 410 from the horizontal delivery platter 405.

Further, as described above, the second feeder assembly 130 may be vertically movable via an actuator (not shown), such that the second feeder assembly 130, including the vertical delivery platter 410 and the second drive wheel 420, may move vertically to a delivery position associated with a container. In an example embodiment, the label-placement module 105 may detect that the second feeder assembly 130 is positioned at the delivery position. For example, the second feeder assembly 130 may be positioned adjacent a top of the container 110 such that the label 210 may be clamped between the container 110 and a lid of the container 110. In response, the label-placement module 105 may drive the second drive wheel 420. The second drive wheel 420 may rotatably push or otherwise move the label 210 forward in the first direction 445 towards the container.

Further and in an example embodiment, the second sensor 460 may detect the leading edge 465 and/or a trailing edge 470 of the label 210. In response, the label-placement module 105 may stop the second drive wheel 420 when at least a portion of the label 210 is positioned above or otherwise adjacent to the container.

Figure 5:
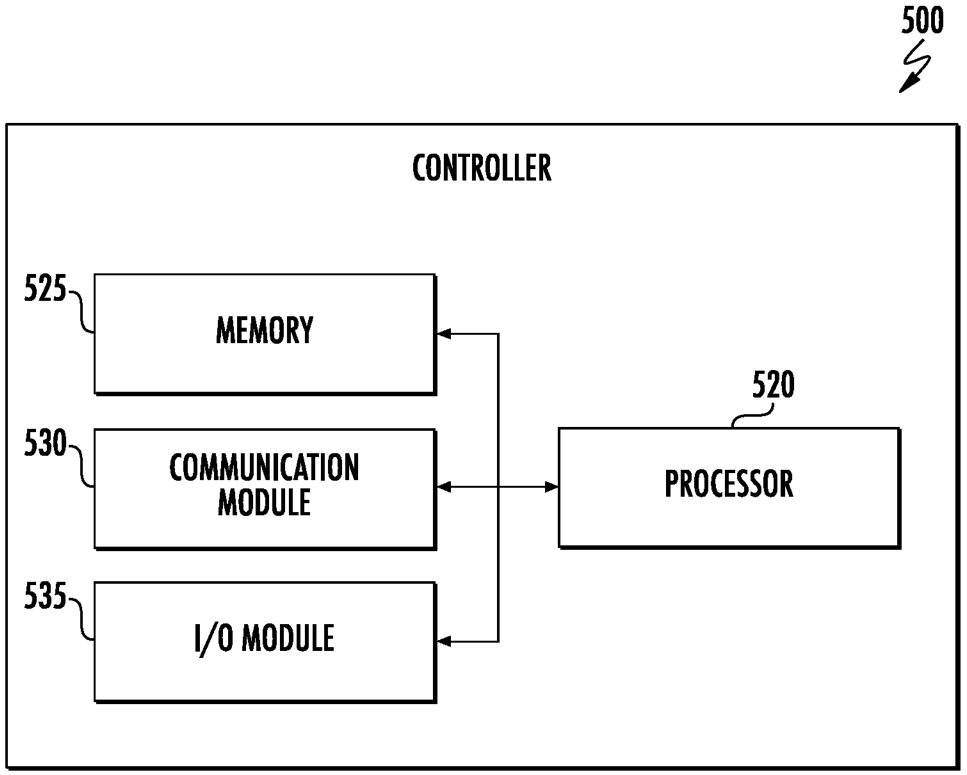
FIG. 5 illustrates a schematic block diagram of a controller of the material handling system, in accordance with one or more embodiments of the present disclosure.

FIG. 5 illustrates a schematic block diagram of a controller 500 for controlling the operation of the material handling system 100, in accordance with one or more embodiments of the present disclosure. As shown, the controller 500 may include at least one processor 520, memory 525, communication module 530, and input/output module 535. The processor 520 may be configured with processor executable instructions to perform operations described herein. Processor 520 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments processor 520 may comprise a plurality of processors. The plurality of processors may be embodied on a single device or may be distributed across a plurality of devices. The plurality of processors may be in operative communication with each other and may be collectively configured to perform one or more functionalities of the controller 500 as described herein. In an example embodiment, processor 520 is configured to execute instructions stored in memory 525 or otherwise accessible to processor 520. These instructions, when executed by processor 520, may cause controller 500 to perform one or more of the functionalities of controller 500, as will be described with reference to FIG. 6.

Memory 525 may comprise, for example, volatile memory, non-volatile memory, or some combination thereof. Although illustrated in FIG. 5 as a single memory, memory 525 may comprise a plurality of memory components. The plurality of memory components may be embodied on a single device or distributed across a plurality of devices. In various embodiments, memory 525 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. Memory 525 may be configured to store information, data (including item data and/or profile data), applications, instructions, or the like for enabling controller 500 to carry out various functions in accordance with example embodiments of the present invention. For example, in at least some embodiments, memory 525 may buffer input data for processing by processor 520. Additionally or alternatively, in at least some embodiments, memory 525 may store program instructions for execution by processor 520. Memory 525 may store information in the form of static and/or dynamic information. This stored information may be stored and/or used by the controller 500 during the course of performing its functionalities.

Communications module 530 may be embodied as any device or means embodied in circuitry, hardware, a computer program product comprising computer readable program instructions stored on a computer readable medium (e.g., memory 525) and executed by a processing device (e.g., processor 520), or a combination thereof that is configured to receive and/or transmit data from/to another device and/or network, such as, for example, sensors, label-placement module 105, and the like. In some embodiments, communications module 530 (like other components discussed herein) may be at least partially embodied as or otherwise controlled by processor 520. In this regard, communications module 530 may be in communication with processor 520, such as via a bus. Communications module 530 may include, for example, an antenna, a transmitter, a receiver, a transceiver, network interface card and/or supporting hardware and/or firmware/software for enabling communications with another device. Communications module 530 may be configured to receive and/or transmit any data that may be stored by memory 525 using any protocol that may be used for communications between devices. Communications module 530 may additionally or alternatively be in communication with the memory 525, input/output module 535 and/or any other component of the controller 500, such as via a bus.

Input/output module 535 may be in communication with processor 520 to receive an indication of a user input and/or to provide an audible, visual, mechanical, or other output to a user. As such, input/output module 535 may include support, for example, for a keyboard, a mouse, a joystick, a display, a touch screen display, a microphone, a speaker, a RFID reader, barcode reader, biometric scanner, and/or other input/output mechanisms. In embodiments wherein the controller 500 is embodied as a server or database, aspects of input/output module 535 may be reduced as compared to embodiments where the controller 500 is implemented as an end-user machine (e.g., remote worker device and/or employee device) or other type of device designed for complex user interactions. In some embodiments (like other components discussed herein), input/output module 535 may even be eliminated from the controller 500. Alternatively, such as in embodiments wherein the controller 500 is embodied as a server or database, at least some aspects of input/output module 535 may be embodied on an apparatus used by a user that is in communication with the controller 500. Input/output module 535 may be in communication with the memory 525, communications module 530, and/or any other component(s), such as via a bus. One or more than one input/output module and/or other component can be included in the controller 500.

As described above and as will be appreciated based on this disclosure, embodiments of the present invention may be configured as methods, conveyors, material handling systems, warehouse management servers, personal computers, servers, mobile devices, backend network devices, and the like. Accordingly, embodiments may comprise various means formed entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described below with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 520, as discussed above with reference to FIG. 5, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 525) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein. Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Figure 6:
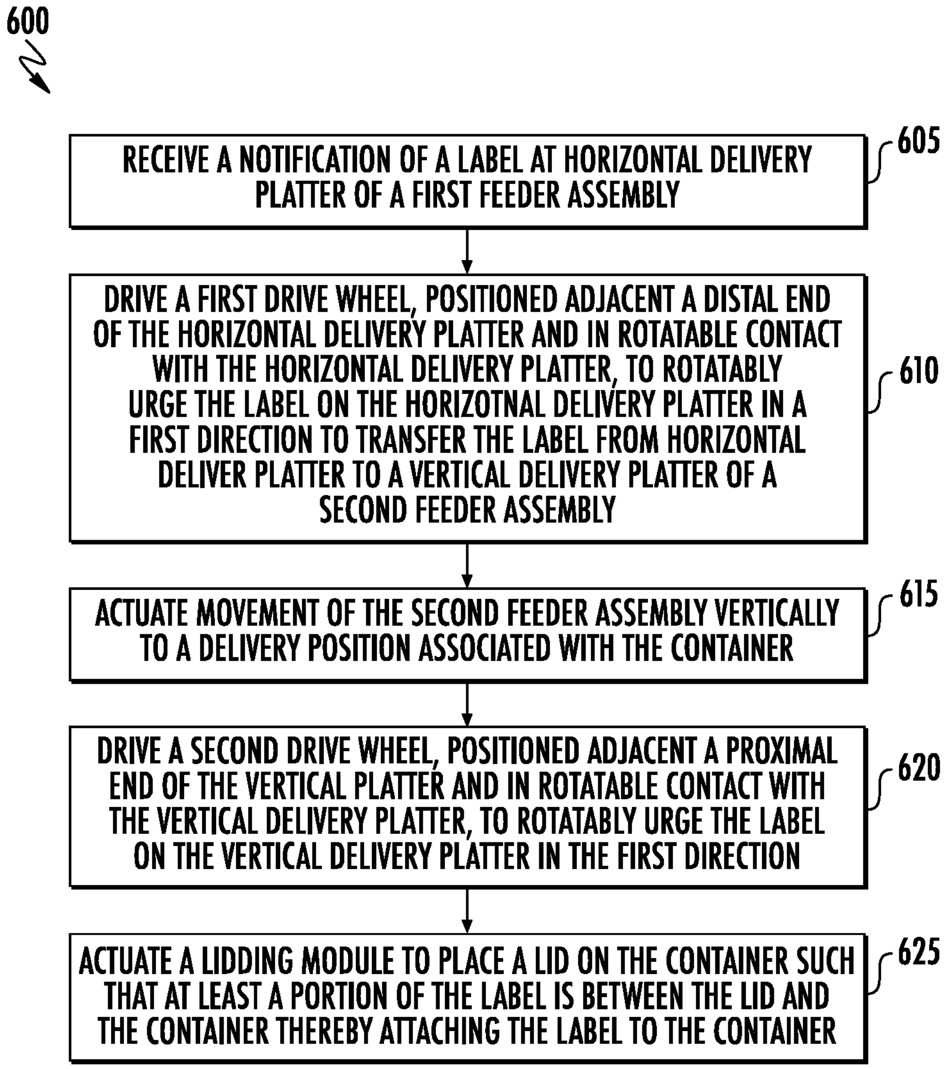
FIG. 6 illustrates an example method for operating the material handling system, in accordance with one or more embodiments of the present disclosure.

FIG. 6 illustrates an example method 600 for operating the material handling system 100, in accordance with one or more embodiments of the present disclosure. The method 600 may include, at block 605, receiving, by the material handling system 100 and/or the controller 500, a notification of a label 210 at the horizontal delivery platter 405 of a first feeder assembly 125. In an exemplary embodiment, as described above with reference to FIGS. 1 and 4, the horizontal delivery platter 405 may receive the label 210 from the label delivery ramp 120. Further, a sensor 450 may detect a presence of the label 210 on the horizontal delivery platter 405 and may provide a notification of the presence of the label 210 on the horizontal delivery platter to the material handling system 100 and/or the controller 500. As described above, the sensor 450 may include photo-eyes, proximity sensors, encoders, etc. for detecting a leading and/or a trailing edge of the label 210.

At block 610, the method 600 may include driving, by the material handling system 100 and/or the controller 500, the first drive wheel 415, positioned adjacent to a distal end 430 of the horizontal delivery platter 405 and in rotatable contact with the horizontal delivery platter 405, to rotatably move and/or urge the label 210 on the horizontal delivery platter 405 in a first direction to transfer the label 210 from horizontal delivery platter 405 to a vertical delivery platter 410 of a second feeder assembly 130. The method 600 further includes actuating, by the material handling system 100 and/or the controller 500, movement of the second feeder assembly 130 vertically to a delivery position associated with the container 110, at block 615 as described above with reference to FIGS. 1 and 4. In an example embodiment, the delivery position may be determined by the material handling system 100 and/or the controller 500 based on one or more parameters, such as but not limited to, height, dimensions, shape, size, and the like, of the container 110.

The method 600 may further include driving, by the material handling system 100 and/or the controller 500, the second drive wheel 420, positioned adjacent to a proximal end 435 of the vertical delivery platter 410 and in rotatable contact with the vertical delivery platter 410, to rotatably move and/or urge the label 210 on the vertical delivery platter 410 in the first direction towards the container 110, at block 620.

The method 600 may further include actuating, by the material handling system 100 and/or the controller 500, the lidding module 145 to place a lid on the container 110 such that at least a portion of the label 210 is clamped between the lid 205 and the container 110 thereby attaching the label 210 to the container 110, at block 625, as described above with reference to FIGS. 1, 2, and 4.

Thus, the material handling system 100 including the label-placement module 105 may automatically affix labels to reusable containers, such that, the labels may be easily removable from the containers without incurring extra time and/or cost, and without leaving any residue.

It must be noted that, as used in this specification and the appended claims, the singular forms “a,” “an,” and “the” include plural referents unless the content clearly dictates otherwise.

References within the specification to “one embodiment,” “an embodiment,” “embodiments”, or “one or more embodiments” are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms “comprises,” “comprising,” and other derivatives from the root term “comprise” are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A material handling system comprising:
- a label-placement module comprising:
  - a first feeder assembly comprising:
    - a first drive wheel; and
    - a horizontal delivery platter that is sized to receive a label, wherein the first drive wheel is positioned above the horizontal delivery platter, and the first drive wheel is sized to receive the label from the horizontal delivery platter; and
  - a second feeder assembly coupled to an actuator, wherein the actuator moves the second feeder assembly vertically to a delivery position associated with a container, the second feeder assembly comprising:

a vertical delivery platter that is positioned adjacent the horizontal delivery platter and the first drive wheel; and a second drive wheel positioned adjacent to a proximal end of the vertical delivery platter and is in rotatable contact with the vertical delivery platter, wherein the second drive wheel is rotatable to move the label on the vertical delivery platter in a first direction to a position adjacent the container.

2. The material handling system of claim 1, wherein the label-placement module further comprises a label delivery ramp having an inclined surface for delivering labels from a printer to the horizontal delivery platter.

3. The material handling system of claim 1, wherein the actuator moves the second feeder assembly along a vertical rail to one of a plurality of delivery positions associated with one or more containers.

4. The material handling system of claim 1, wherein the label-placement module further comprises a container detection module having one or more sensors detecting one or more parameters associated with the container.

5. The material handling system of claim 4, wherein the actuator moves the second feeder assembly to one of a plurality of delivery positions based on the one or more parameters associated with the container.

6. The material handling system of claim 1, wherein the second feeder assembly further comprises a first sensor positioned at the proximal end of the vertical delivery platter, wherein the first sensor detects at least one of a leading edge or a trailing edge of the label on the vertical delivery platter.

7. The material handling system of claim 1, wherein the second feeder assembly further comprises a second sensor positioned at the distal end of the vertical delivery platter, wherein the second sensor detects at least one of a leading edge and a trailing edge of the label on the vertical delivery platter.

8. The material handling system of claim 1, wherein the first feeder assembly further comprises a first drive wheel that is positioned adjacent to a distal end of the horizontal delivery platter and is in rotatable contact with the horizontal delivery platter, wherein the first drive wheel is rotatable to move the label on the horizontal delivery platter in a first direction.

9. The material handling system of claim 1, further comprising a controller configured to:

receive a notification of a presence of the label on the horizontal delivery platter; and in response to the notification, drive the first drive wheel to rotatably move the label forward in the first direction to transfer the label from the horizontal delivery platter to the vertical delivery platter.

10. The material handling system of claim 9, wherein the controller is further configured to:

actuate the actuator to move the second feeder assembly vertically to the delivery position associated with the container;

drive the second drive wheel to rotatably move the label forward in the first direction towards the container; and actuate a lidding module to place the lid on the container such that at least a portion of the label is between the lid and the container thereby attaching the label to the container.

11. A method of placing a label on a container, the method comprising:

receiving the label at a horizontal delivery platter of a first feeder assembly;

actuating an actuator coupled to a second feeder assembly to move the second feeder assembly vertically to a delivery position associated with the container;

receiving the label at a vertical delivery platter of the second feeder assembly from the horizontal delivery platter via a first drive wheel positioned above the horizontal delivery platter; and driving a second drive wheel, positioned adjacent to a proximal end of the vertical delivery platter and in rotatable contact with the vertical delivery platter, to rotatably move the label on the vertical delivery platter in a first direction to a position adjacent the container.

12. The method of claim 11, further comprising:

detecting a presence of the label on the horizontal platter by a first sensor that detects a leading and/or a trailing edge of the label.

13. The method of claim 12, wherein the first sensor includes at least one of a photo-eye sensor, a proximity sensor, or an encoder.

14. The method of claim 12, wherein in response to detection of the label, the second drive wheel is driven via a second roller such that the second drive wheel contacts at least a portion of the label to rotatably push the label forward onto the vertical delivery platter.

15. The method of claim 11, further comprising:

driving a first drive wheel of the first feeder assembly that is positioned adjacent to a distal end of the horizontal delivery platter and in rotatable contact with the horizontal delivery platter, to rotatably move and/or urge the label on the horizontal delivery platter in the first direction to transfer the label from horizontal delivery platter to the vertical delivery platter of the second feeder assembly.

16. The method of claim 11, wherein the actuator moves the second feeder assembly along a vertical rail to one of a plurality of delivery positions associated with one or more containers.

17. The method of claim 11, further comprising:

driving a lidding module to place a lid on the container such that at least a portion of the label is clamped between the lid and the container thereby attaching the label to the container.

18. The method of claim 11, wherein the actuator moves the second feeder assembly to one of a plurality of delivery positions based on the one or more parameters associated with the container.

19. The method of claim 11, wherein the driving of the second drive wheel is stopped based on detection of a leading edge or a trailing edge of the label on the vertical delivery platter by a second sensor.

20. The method of claim 11, wherein the label is received at the horizontal delivery platter from a label delivery ramp that receives the label from a printer.

* * * * *